US008103370B2

(12) United States Patent
Suda

(10) Patent No.: US 8,103,370 B2
(45) Date of Patent: Jan. 24, 2012

(54) IN-VEHICLE AUDIO DEVICE AND METHOD FOR PERFORMING IMAGING AND TRANSMISSION OF INFORMATION IN IN-VEHICLE AUDIO DEVICE

(75) Inventor: Hidetaka Suda, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1090 days.

(21) Appl. No.: 11/946,965

(22) Filed: Nov. 29, 2007

(65) Prior Publication Data

US 2008/0141119 A1 Jun. 12, 2008

(30) Foreign Application Priority Data

Dec. 11, 2006 (JP) ................................ 2006-333400

(51) Int. Cl.
*G06F 17/00* (2006.01)

(52) U.S. Cl. ........................................................ 700/94

(58) Field of Classification Search ..................... 700/94
See application file for complete search history.

(56) References Cited

U.S. PATENT DOCUMENTS

| | | | |
|---|---|---|---|
| 7,050,869 B1 | 5/2006 | Katayama et al. | |
| 7,158,842 B2 | 1/2007 | Ohmura et al. | |
| 2006/0107295 A1 * | 5/2006 | Margis et al. | 725/81 |

FOREIGN PATENT DOCUMENTS

| | | |
|---|---|---|
| JP | 2000-356990 | 12/2000 |
| JP | 2002-149165 | 5/2002 |
| JP | 2003-196919 | 7/2003 |
| JP | 2006-228329 | 8/2006 |

OTHER PUBLICATIONS

Notification of Reason for Rejection directed against Japanese Patent Application No. 2006-333400, dated May 9, 2011, (4 pgs.).

* cited by examiner

*Primary Examiner* — Andrew C Flanders
(74) *Attorney, Agent, or Firm* — Brinks Hofer Gilson & Lione

(57) ABSTRACT

An in-vehicle audio device that can be connected to a portable audio device may include a display generating unit operative to generate transmission image data in a format that can be displayed in the portable audio device from tune information data corresponding to audio data read from the portable audio device when the portable audio device is connected to the in-vehicle audio device, and a communication unit operative to send the transmission image data generated by the display generating unit to the portable audio device when the portable audio device is connected to the in-vehicle audio device.

19 Claims, 5 Drawing Sheets

BIT PATTERN →

ADDRESS ↓

| | F | E | D | C | B | A | 9 | 8 | 7 | 6 | 5 | 4 | 3 | 2 | 1 | 0 | HEXADECIMAL REPRESENTATION |
|---|---|---|---|---|---|---|---|---|---|---|---|---|---|---|---|---|---|
| 0000h | 0 | 0 | 0 | 0 | 0 | 0 | 0 | 0 | 1 | 0 | 0 | 0 | 0 | 0 | 0 | 0 | 0080h |
| 0001h | 0 | 0 | 0 | 0 | 0 | 0 | 0 | 0 | 1 | 0 | 0 | 0 | 0 | 0 | 0 | 0 | 0080h |
| 0002h | 0 | 1 | 1 | 1 | 1 | 1 | 1 | 1 | 1 | 1 | 1 | 1 | 1 | 1 | 1 | 1 | 7FFFh |
| 0003h | 0 | 1 | 0 | 0 | 0 | 0 | 0 | 0 | 0 | 0 | 0 | 0 | 0 | 0 | 0 | 1 | 4001h |
| 0004h | 0 | 1 | 0 | 0 | 0 | 0 | 0 | 0 | 0 | 0 | 0 | 0 | 0 | 0 | 0 | 1 | 4001h |
| 0005h | 0 | 0 | 0 | 0 | 0 | 1 | 1 | 1 | 1 | 1 | 1 | 1 | 0 | 0 | 1 | 0 | 07F2h |
| 0006h | 0 | 0 | 0 | 0 | 0 | 0 | 0 | 0 | 0 | 0 | 1 | 0 | 0 | 0 | 0 | 0 | 0020h |
| 0007h | 0 | 0 | 0 | 0 | 0 | 0 | 0 | 0 | 0 | 1 | 0 | 0 | 0 | 0 | 0 | 0 | 0040h |
| 0008h | 0 | 1 | 1 | 1 | 1 | 1 | 1 | 1 | 1 | 1 | 1 | 1 | 1 | 1 | 1 | 1 | 7FFFh |
| 0009h | 0 | 0 | 0 | 0 | 0 | 0 | 0 | 0 | 1 | 0 | 0 | 0 | 0 | 0 | 0 | 0 | 0080h |
| 000Ah | 0 | 0 | 0 | 0 | 0 | 0 | 0 | 0 | 0 | 1 | 0 | 0 | 0 | 0 | 0 | 0 | 0040h |
| 000Bh | 0 | 0 | 0 | 0 | 0 | 0 | 0 | 0 | 0 | 1 | 0 | 0 | 0 | 0 | 0 | 0 | 0040h |
| 000Ch | 0 | 0 | 0 | 0 | 0 | 0 | 0 | 0 | 0 | 1 | 0 | 0 | 0 | 0 | 0 | 0 | 0040h |
| 000Dh | 0 | 0 | 0 | 0 | 0 | 0 | 0 | 0 | 1 | 0 | 0 | 0 | 0 | 0 | 0 | 0 | 0080h |
| 000Eh | 0 | 0 | 0 | 0 | 0 | 0 | 0 | 1 | 0 | 0 | 0 | 0 | 0 | 0 | 0 | 0 | 0100h |
| 000Fh | 0 | 0 | 0 | 0 | 0 | 0 | 0 | 0 | 0 | 0 | 0 | 0 | 0 | 0 | 0 | 0 | 0000h |

IN-VEHICLE AUDIO DEVICE AND METHOD FOR PERFORMING IMAGING AND TRANSMISSION OF INFORMATION IN IN-VEHICLE AUDIO DEVICE

RELATED APPLICATIONS

The present application claims priority to Japanese Patent Application Serial Number 2006-333400, filed Dec. 11, 2006, the entirety of which is hereby incorporated by reference.

FIELD OF THE INVENTION

The present invention relates to in-vehicle audio devices and methods for performing imaging and transmission of information in the in-vehicle audio devices, and in particular, relates to an in-vehicle audio device that can be connected to a portable audio device and a method for performing imaging and transmission of information in the in-vehicle audio device.

BACKGROUND OF THE INVENTION

Recently, it has become popular to obtain tunes, such as musical songs, via the Internet, using mobile terminals such as mobile phones. Moreover, it is becoming popular to connect mobile terminals to in-vehicle audio devices. An example of such an in-vehicle audio device is proposed in Japanese Unexamined Patent Application Publication No. 2002-149165. In the in-vehicle audio device, desired tunes can be heard in a vehicle using an Internet function of a mobile terminal and tunes distributed via the Internet may be used as sound sources, without an expensive car audio device. According to Japanese Unexamined Patent Application Publication No. 2002-149165, a mobile terminal associated with the in-vehicle audio device can receive music data distributed via the Internet. Further, the in-vehicle audio device may include a display screen for displaying information associated with the received music data. Thus, in the in-vehicle audio device, tune titles, artist names, and the like can be displayed on the display screen.

Meanwhile, it is becoming popular to connect portable audio devices that have recently been in widespread use to in-vehicle audio devices. In general, portable audio devices include display units. Some portable audio devices receive an input of image data from in-vehicle audio devices and display the input image data on the display units when the portable audio devices are connected to the in-vehicle audio devices. Specifically, for example, a portable audio device is available, which performs such a display operation when the portable audio device is connected to an in-vehicle audio device with a universal serial bus (USB).

FIG. 7 illustrates a display state of a general in-vehicle audio device 100X and a general portable audio device 200 connected to each other with a USB. In the portable audio device 200, an image transmitted to the portable audio device 200 is displayed on the display unit 210 when the portable audio device 200 is connected to the in-vehicle audio device 100X with a USB. The display unit 210 may be a liquid crystal display (LCD). Thus, the in-vehicle audio device 100X can use the display unit 210 in the portable audio device 200, for example, in a manner in which the in-vehicle audio device 100X sends image data that includes a company's logo to the portable audio device 200.

To provide an inexpensive in-vehicle audio device, the in-vehicle audio device may include a segment display (for example, a fourteen-segment display or a sixteen-segment display). In general, in segment displays, although Arabic numerals, alphabets, and the like can be displayed, kanji characters, hiragana characters, and the like that are more complicated cannot be displayed because the expression is difficult. Thus, in the combination of the portable audio device 200 and the in-vehicle audio device 100X, tune titles, artist names, and the like that include kanji characters, kana characters, and the like cannot be displayed in both the portable audio device 200 and the in-vehicle audio device 100X while a tune is played back. In this case, in many cases, for example, a display such as "NO SUPPORT" as shown in FIG. 7 is presented in the in-vehicle audio device 100X.

Greater functionality has been achieved in in-vehicle audio devices, and users can perform a setting operation on various functions provided in in-vehicle audio devices. When such a setting operation is performed, in an in-vehicle audio device that includes a segment display, in many cases, settings on functions are displayed so that the settings are expressed in an abbreviated form, combining alphabets and Arabic numerals, because it is difficult to schematically express the settings. Since it is difficult to intuitively understand settings, seeing such a display, users are forced to perform a setting operation with reference to an instruction manual or intuitively on the basis of the results of operations until the users get accustomed to the display. Thus, an in-vehicle audio device that includes a segment display is less convenient for users in this respect, and useful functions may not be sufficiently effectively used due to such an inconvenience. Moreover, even in the case of an in-vehicle audio device that includes an LCD, when the size of the display unit is small, it has been difficult to schematically express settings on functions.

SUMMARY OF THE INVENTION

Accordingly, in view of the aforementioned problems, it is an object of the present invention to provide an in-vehicle audio device and a method for performing imaging and transmission of information in the in-vehicle audio device, in which, even when a display unit is a low-cost segment display or the like, when a portable audio device displays input image data when the portable audio device is connected to the in-vehicle audio device, the display unit in the portable audio device may be used to provide useful information to users.

An in-vehicle audio device according to a first aspect of the present invention that can be connected to a portable audio device includes an image data generating unit that generates transmission image data in a format that can be displayed in the portable audio device from information data that includes visually communicable information, and an image data sending unit that sends the transmission image data generated by the image data generating unit to the portable audio device when the portable audio device is connected to the in-vehicle audio device. In the in-vehicle audio device according to the first aspect of the present invention, even when the display unit is a segment display or the like, when the portable audio device displays input image data when the portable audio device is connected to the in-vehicle audio device, the display unit in the portable audio device may provide useful information to users. The aforementioned connection is not limited to a connection between an in-vehicle audio device and a portable audio device with a USB. For example, the connection between the in-vehicle audio device and the portable audio device may be established via wired or wireless communication.

The information data may be tune information data corresponding to audio data read from the portable audio device when the portable audio device is connected to the in-vehicle audio device. Because the aforementioned tune information data is useful information for users, it is preferable that the information data be the tune information data. The audio data and the tune information data may be combined into a single piece of data or linked to each other.

When the portable audio device is connected to the in-vehicle audio device and the audio data and tune information data corresponding to the audio data are read from the portable audio device in response to an instruction to perform playback, the image data generating unit may generate the transmission image data from the read tune information data, and the image data sending unit may send the transmission image data to the portable audio device.

The tune information data may be tune character data that includes character information associated with a tune. Character information associated with a tune may include not only the title, artist name, lyricist name, composer name, and sale date of the tune, but also various types of character information associated with the tune such as the folder number and file number of the tune when the tune is stored in the portable audio device.

The image data generating unit may read font data corresponding to the character information, which constitutes the tune character data, from a data storage unit that stores the font data. The image data generating unit may then generate the transmission image data on the basis of the read font data. Specifically, the character information may be character code, such as the Japanese Industrial Standards (JIS) code, the American National Standard Code for Information Interchange (ASCII), or the Unicode.

The tune information data may be tune image data that includes image information associated with a tune. In some cases, tune image data may include image information associated with a currently commercially available tune such as image data of a jacket or an artist associated with the tune. Thus it is preferable that the aforementioned tune image data be supported as the tune information data.

An image data format determining unit may be further provided, which determines the format of the tune image data before the image data generating unit generates the transmission image data. When the image data format determining unit determines the format of the tune image data can be displayed in the portable audio device, the image data sending unit may send the tune image data to the portable audio device as the transmission image data.

In this case, when the format of the tune image data is a format of image data that can be displayed in the portable audio device, conversion (generation of transmission image data) is not necessary. Thus, it is preferable that the format of the tune image data be determined as described above. The image data format determining unit may be provided as a part of the image data generating unit. In the portable audio device that presents a display based on input image data when the portable audio device is connected to the in-vehicle audio device, even when conversion is not necessary, an image can be displayed by sending the tune image data as the transmission image data, as described above.

The information data may be setting information image data that includes image information that schematically expresses setting information on a function of the in-vehicle audio device. For example, because the aforementioned setting information image data is useful information for users, it is preferable that the information data be the setting information image data.

When a setting mode for performing a setting operation on a function of the in-vehicle audio device is selected, the image data generating unit may generate the transmission image data from setting information image data corresponding to the function, on which the setting operation is performed in the selected setting mode. Additionally, the image data sending unit may send the transmission image data to the portable audio device.

When a setting operation is performed on a function of the in-vehicle audio device, the image data generating unit may generate the transmission image data from the setting information image data corresponding to the function, on which the setting operation is performed. Additionally, the image data sending unit may send the transmission image data to the portable audio device.

The setting information may include setting information associated with a function for adjusting the timing of sound emission of individual speakers in the in-vehicle audio device. Further, the setting information image data may be data that includes an image in which the setting information is schematically expressed in the form of a virtual layout of the speakers.

A setting information image generating unit may be further provided that generates the setting information image data from setting information data that includes the setting information. The setting information image generating unit may be provided as a part of the image data generating unit. In this case, while the setting information image data is generated from the setting information data, the setting information image data can be generated as the transmission image data. That is to say, in this case, the setting information image data is not generated substantially, and the transmission image data can be generated from the setting information data. On the other hand, when the setting information image generating unit and the image data generating unit are provided separately, the setting information image generating unit only needs to generate the setting information image data in a predetermined format. Thus, for example, the design can be simplified because functions are separated.

The transmission image data may be image data in the bitmap format. However, the transmission image data is not limited to image data in the bitmap format and may be image data in various formats based on specification of the portable audio device such as the Joint Photographic Experts Group (JPEG) format. It is preferable that a format of image data applicable to the transmission image data be automatically determined when the connected portable audio device is recognized. Alternatively, a format of image data applicable to the transmission image data may be manually set.

A method according to a second aspect of the present invention for performing imaging and transmission of information in an in-vehicle audio device that can be connected to a portable audio device is provided. The method may include generating transmission image data in a format that can be displayed in the portable audio device from information data that includes visually communicable information, and sending the generated transmission image data to the portable audio device when the portable audio device is connected to the in-vehicle audio device.

In a case where the information data is tune information data corresponding to audio data read from the portable audio device when the portable audio device is connected to the in-vehicle audio device, when audio data and tune information data corresponding to the audio data are read from the portable audio device when the portable audio device is connected to the in-vehicle audio device in response to an instruction to perform playback, the transmission image data may be generated from the read tune information data. Additionally, the transmission image data may be sent to the portable audio device.

In a case where the information data is tune information data corresponding to audio data read from the portable audio device when the portable audio device is connected to the in-vehicle audio device, and the tune information data is tune character data that includes character information associated with a tune, the transmission image data may be generated on the basis of font data corresponding to the character information, which constitutes the tune character data.

In a case where the information data is tune information data corresponding to audio data read from the portable audio device when the portable audio device is connected to the in-vehicle audio device, and the tune information data is tune image data that includes image information associated with a tune, the format of the tune image data may be determined before the transmission image data is generated from the tune image data. Further, when the determined format of the tune image data is a format of image data that can be displayed in the portable audio device, the tune image data may be sent to the portable audio device as the transmission image data.

In a case where the information data is setting information image data that includes image information that schematically expresses setting information on a function of the in-vehicle audio device, when a setting mode for performing a setting operation on a function of the in-vehicle audio device is selected, the transmission image data may be generated from setting information image data corresponding to the function, on which the setting operation is performed in the selected setting mode. Additionally, the transmission image data may be sent to the portable audio device.

In a case where the information data is setting information image data that includes image information that schematically expresses setting information on a function of the in-vehicle audio device, when a setting operation is performed on a function of the in-vehicle audio device, the transmission image data may be generated from setting information image data corresponding to the function, on which the setting operation is performed. Additionally, the transmission image data may be sent to the portable audio device.

The setting information image data may be generated from setting information data that includes the setting information.

The transmission image data may be image data in the bitmap format.

As described below, an in-vehicle audio device and a method for performing imaging and transmission of information in the in-vehicle audio device can be provided, in which, even when a low-cost segment display, or the like, is applied as a display unit, and a portable audio device displays input image data when the portable audio device is connected to the in-vehicle audio device, useful information can be provided to users using a display unit in the portable audio device.

DESCRIPTION OF THE PREFERRED EMBODIMENTS

Figure 1:
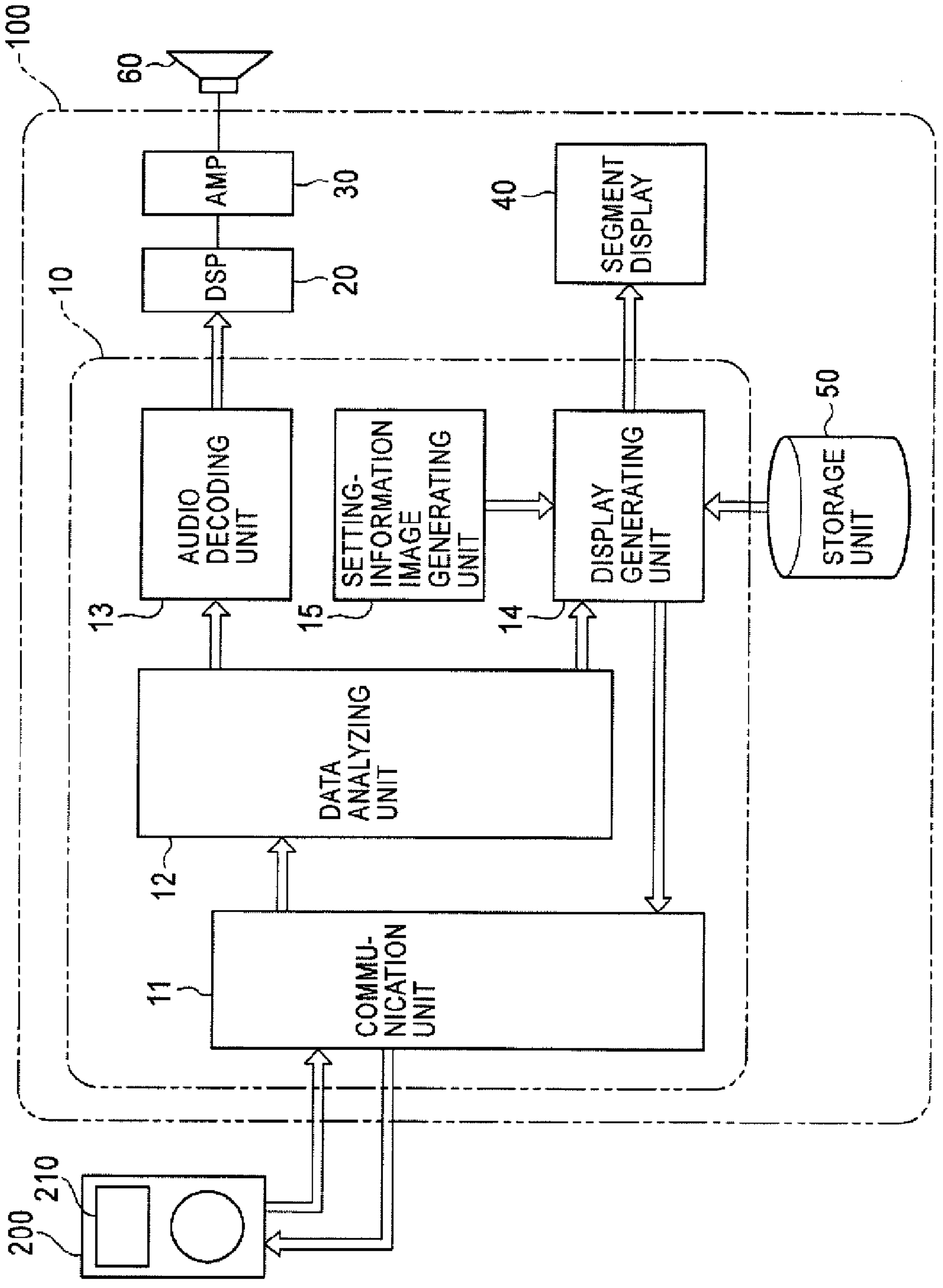
FIG. 1 illustrates a structure of an in-vehicle audio device together with a portable audio device.

FIG. 1 illustrates a structure of an in-vehicle audio device (hereinafter just called an audio device) 100, together with a portable audio device 200. FIG. 1 illustrates a state in which the portable audio device 200 is connected to the audio device 100 with a USB. In this state, the portable audio device 200 displays image data on the display unit 210 that is input from the audio device 100. Moreover, in this state, the portable audio device 200 can display image data in the bitmap format. In one implementation, the display unit 210 may be a LCD. The portable audio device 200 may include a hard disk drive (HDD) storing tune data in the Moving Picture Experts Group (MPEG) Audio Layer-3 (MP3) format and other types of data.

The audio device 100 may include a microcomputer 10, a digital signal processor (DSP) 20, an amplifier 30, a segment display 40, a storage unit 50, and an operation unit (not-shown). Speakers 60 are connected to the amplifier 30. The audio device 100 may be connected to a head unit (not shown). A head unit performs overall control of operations of various types of devices connected to the head unit. Other than the audio device 100, various types of devices, for example, a digital audio broadcasting receiver, a Compact Disc (CD) changer, and a Digital Versatile Disc (DVD) audio player, can also be connected to a head unit. In this case, the amplifier 30 and the operation unit may be provided in the head unit so that other devices can share the amplifier 30 and the operation unit. Moreover, these devices, including the audio device 100, together with the head unit, may constitute an all-in-one in-vehicle system. Moreover, the audio device 100 may be provided as a part of the head unit.

The microcomputer 10 may include a central processing unit (CPU), a read only memory (ROM), a random access memory (RAM), an input-output circuit, and the like (not shown). Various types of programs for controlling the operation of the audio device 100 are stored in the ROM. The microcomputer 10, a communication unit 11, a data analyzing unit 12, an audio decoding unit 13, a display generating unit 14, and a setting-information image generating unit 15 may be implemented by the CPU executing various types of programs stored in the ROM.

The communication unit 11 performs data communication with the portable audio device 200. The communication unit 11 obtains audio data and tune information data corresponding to the audio data from the portable audio device 200 in response to an instruction from the operation unit (not shown) operated by a user. The communication unit 11 then transfers these pieces of data to the data analyzing unit 12. In this case, the audio data and the tune information data corresponding to the audio data may be combined as, for example, tune data or linked to each other.

The data analyzing unit 12 breaks the received data down into the audio data and the tune information data. The data analyzing unit 12 transfers the audio data to the audio decoding unit 13 and transfers the tune information data to the display generating unit 14. The audio decoding unit 13 decompresses compressed audio signals of the audio data and outputs the decompressed audio signals to the DSP 20 as digital audio signals. The DSP 20 performs tone control. The digital audio signals having been subjected to the tone control are converted to analog audio signals by a digital-to-analog converter (not shown), and the analog audio signals are output to the speakers 60 via the amplifier 30.

The display generating unit 14 generates information to be displayed. The display generating unit 14 classifies the received tune information data into data of information to be displayed on the segment display 40 and data of information to be displayed on the display unit 210 in the portable audio device 200. Specifically, the display generating unit 14 may first classify the tune information data into tune character data and tune image data. A segment of the tune information data classified as the tune image data is classified as data of information to be displayed in the portable audio device 200.

Subsequently, the display generating unit 14 determines the format of the segment of the tune information data classified as the tune image data. Then, when the determined format of the tune image data is not a format (in the present embodiment, the bitmap format) of image data that can be displayed in the portable audio device 200, the display generating unit 14 generates, from the tune image data, transmission image data in a format (in the present embodiment, the bitmap format) that can be displayed in the portable audio device 200, and transfers the transmission image data to the communication unit 11. For example, when the tune image data is image data in the Joint Photographic Experts Group (JPEG) format, the format of the tune image data is converted to the bitmap format, and the converted tune image data is transferred to the communication unit 11 as the transmission image data. The communication unit 11 transfers the received transmission image data to the portable audio device 200. The transmission image data is displayed on the display unit 210 by this operation. On the other hand, when the determined format of the tune image data is a format of image data that can be displayed in the portable audio device 200, the display generating unit 14 transfers the tune image data to the communication unit 11 without change. The communication unit 11 transfers the received tune image data to the portable audio device 200 as transmission image data. The transmission image data is displayed on the display unit 210 by this operation.

A segment of the tune information data classified as the tune character data is further classified by the display generating unit 14 into data of information to be displayed on the segment display 40 and data of information to be displayed in the portable audio device 200. For example, data, such as a file number and a folder number, is classified as data of information to be displayed on the segment display 40, and data, such as an artist name and a tune title, is classified as data of information to be displayed in the portable audio device 200. The data of information to be displayed on the segment display 40 is converted to display data in the display format of the segment display 40 by the display generating unit 14, and the display data is output to the segment display 40. In this case, other than or in addition to the aforementioned classification by type of data, another type of classification may be performed, in which, for example, when character codes (character data) that constitute tune character data are based on the American National Standard Code for Information Interchange (ASCII), the tune character data is classified as data of information to be displayed on the segment display 40, and when the character codes are Japanese Industrial Standards (JIS) codes, the tune character data is classified as data of information to be displayed in the portable audio device 200.

Figures 2, 3:
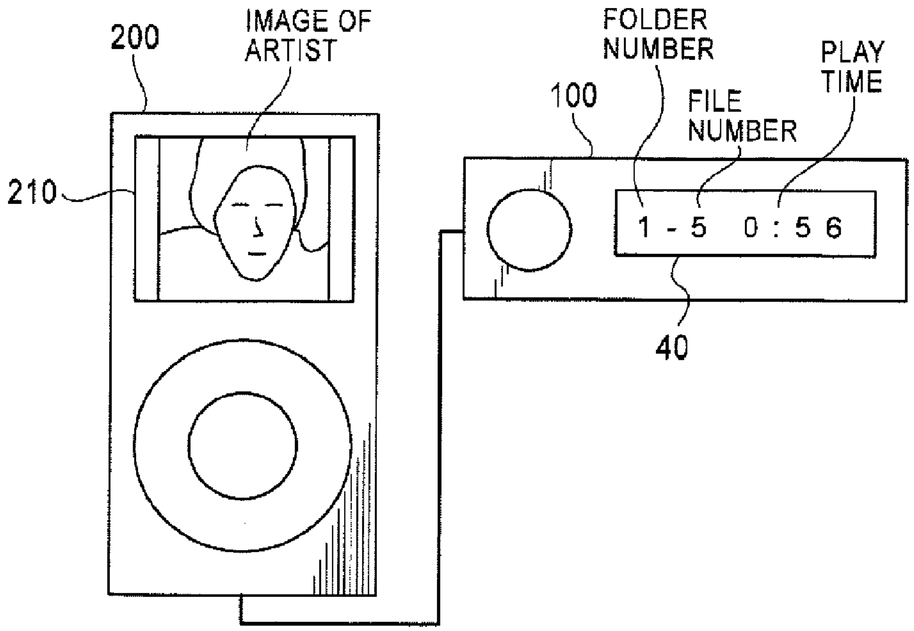
FIG. 2 illustrates a first display state of the in-vehicle audio device according to the embodiment and the portable audio device.
FIG. 3 illustrates a method for generating transmission image data from tune character data.

FIG. 2 illustrates a first display state of the audio device 100 and the portable audio device 200. In the first display state, a display based on transmission image data generated from tune image data is presented in the portable audio device 200. For example, a folder number, a file number, and play time corresponding to a tune that is being played back can be displayed on the segment display 40 in the audio device 100. On the other hand, an image associated with the tune, which is being played back, is displayed on the display unit 210 in the portable audio device 200. This image is based on the transmission image data generated from the tune image data. Thus, the user can view recorded images associated with tunes even with the audio device 100, which includes only the segment display 40.

On the other hand, the display generating unit 14 generates transmission image data from tune character data classified as data of information to be displayed in the portable audio device 200. At this time, the display generating unit 14 reads font data corresponding to individual character codes that constitute the tune character data from the storage unit 50. The storage unit 50 stores various types of data. In one implementation, the storage unit 50 is implemented via a ROM, and the ROM (hereinafter called a font ROM) is dedicated to font data instead of the storage unit 50, font data may be stored in the ROM in the microcomputer 10. Moreover, instead of the storage unit 50, a reader that reads font data from a recording medium may be provided, and the display generating unit 14 may read font data from a recording medium via the reader. In this case, the display generating unit 14 generates transmission image data on the basis of the font data read from the recording medium.

FIG. 3 illustrates a method for generating transmission image data from tune character data. The font ROM stores font data of kanji characters and kana characters in bitmap patterns, as shown in FIG. 3. Thus, the display generating unit 14 converts character codes that constitute tune character data to addresses in the font ROM according to rules corresponding to specifications of the font ROM, and reads, from the font ROM, a predetermined number of words (in the present embodiment, sixteen words) of data starting from each of the addresses. Thus, image data of characters can be obtained from the character codes. The display generating unit 14 obtains image data of characters corresponding to individual character codes that constitute tune character data, as described above, and generates transmission image data by disposing the image data in appropriate locations in a memory area of the RAM provided for generating transmission image data.

The transmission image data generated in the aforementioned manner is image data in the bitmap format. When the format of image data that can be displayed in the portable audio device 200 is in a format other than the bitmap format, such as the JPEG format, the format of the transmission image data generated in the aforementioned manner is converted to the JPEG format, and the transmission image data having been subjected to the conversion is final transmission image data. The display generating unit 14 transfers the transmission image data to the communication unit 11. The communication unit 11 sends the received transmission image data to the portable audio device 200. The transmission image data is displayed on the display unit 210 by this operation.

Figure 4:
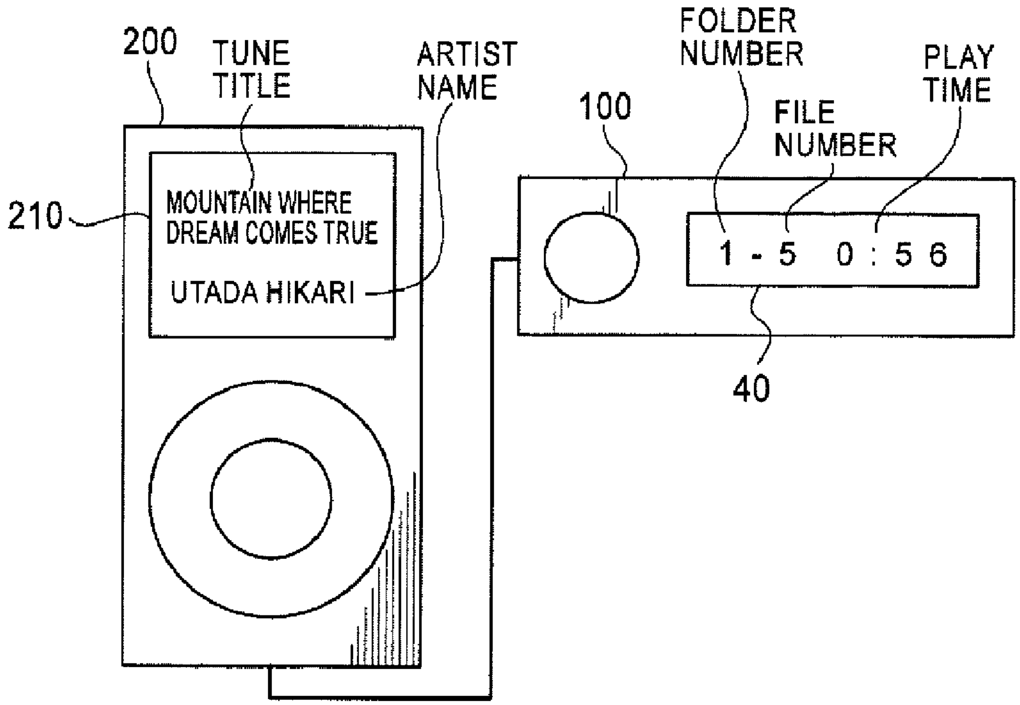
FIG. 4 illustrates a second display state of the in-vehicle audio device and the portable audio device.

FIG. 4 illustrates a second display state of the audio device 100 and the portable audio device 200. In the second display state, a display based on transmission image data generated from tune character data is presented in the portable audio device 200. For example, a folder number, a file number, and play time corresponding to a tune that is being played back can be displayed on the segment display 40 in the audio device 100, as in the first display state. On the other hand, the title and artist name of the tune, which is being played back, and the like is displayed on the display unit 210 in the portable audio device 200. This image is based on the transmission image data generated from the tune character data. Thus, the user can view the title and artist name of the tune, which is being played back, and the like even with the audio device 100, which includes only the segment display 40.

The setting-information image generating unit 15 generates setting information image data from setting information data on functions of the audio device 100. The setting-information image generating unit 15 transfers the generated setting information image data to the display generating unit 14. The display generating unit 14 generates, from the received setting information image data, transmission image data in a format (in the present embodiment, the bitmap format) that can be displayed in the portable audio device 200, and transfers the transmission image data to the communication unit 11. The communication unit 11 sends the received transmission image data to the portable audio device 200. The transmission image data is displayed on the display unit 210 by this operation. In this case, the setting-information image generating unit 15 may be provided as a part of the display generating unit 14.

Figure 5:
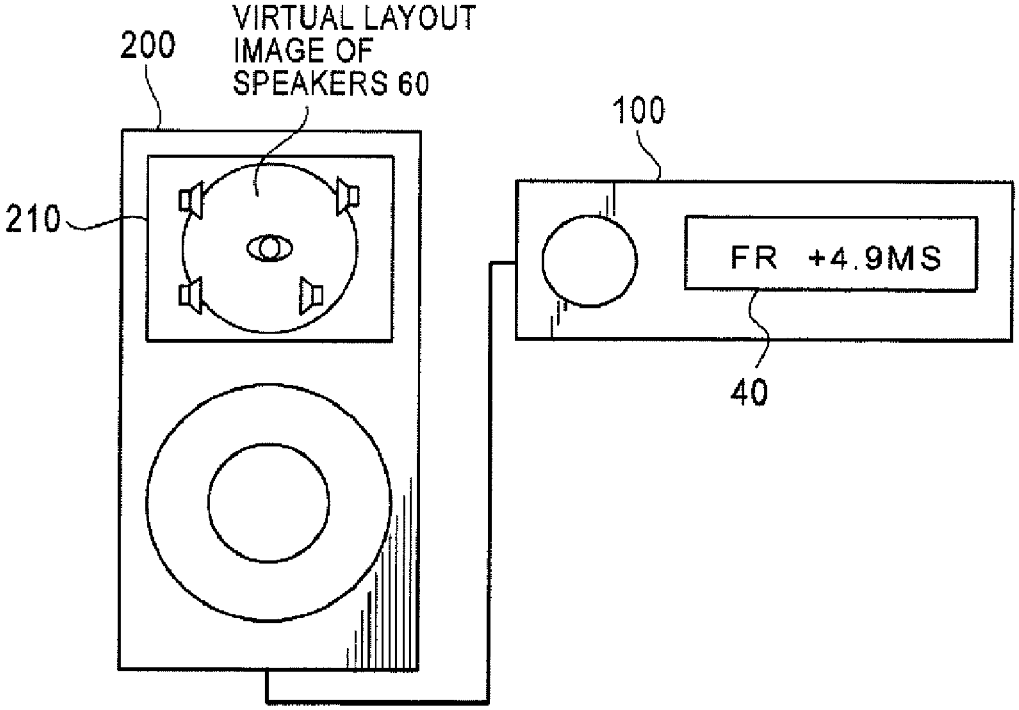
FIG. 5 illustrates a third display state of the in-vehicle audio device and the portable audio device.

FIG. 5 illustrates a third display state of the audio device 100 and the portable audio device 200. In the third display state, a display based on transmission image data generated from setting information image data is presented in the portable audio device 200. FIG. 5 illustrates a case where setting information on the time correction (TCR) function is displayed. The TCR function is a function of adjusting the timing of sound emission of each of the speakers 60. Setting information on the TCR function can be displayed on the segment display 40 in the audio device 100 in an abbreviated form. In the case shown in FIG. 5, a character string "FR" shows that setting information on one of the speakers 60 on the front right side is currently displayed, and a character string "+4.9MS" shows that settings are configured so that the timing of sound emission of one of the speakers 60 on the front right side is delayed by 4.9 msec with respect to the reference level.

On the other hand, an image in which the aforementioned setting information is schematically expressed in the form of a virtual layout of the speakers 60 is displayed on the display unit 210 in the portable audio device 200. This image is based on the transmission image data generated from the setting information image data. Thus, the user can view setting information on functions of the audio device 100 in a visually comprehendible manner even with the audio device 100, which includes only the segment display 40.

Figure 6A:
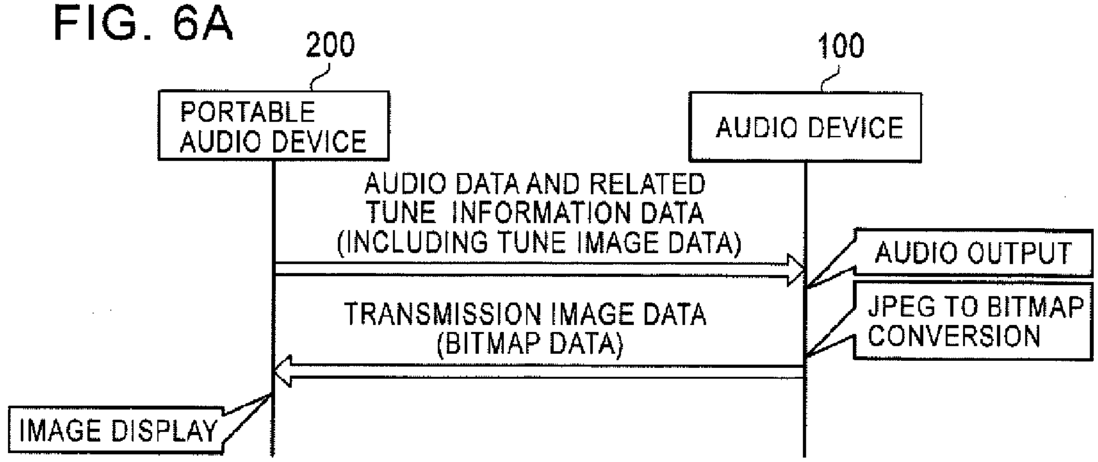
FIGS. 6A, 6B, and 6C are sequence charts illustrating the operation of the in-vehicle audio device.

The operation of the audio device 100 will now be described in detail with reference to sequence charts shown in FIGS. 6A, 6B, and 6C. A first sequence chart shown in FIG. 6A, a second sequence chart shown in FIG. 6B, and a third sequence chart shown in FIG. 6C correspond to a process of reaching the first display state, a process of reaching the second display state, and a process of reaching the third display state, respectively. When an image based on tune image data is to be displayed in the portable audio device 200, under an instruction to perform playback based on the user operation and the like, the audio device 100 reads audio data and tune information data associated with the audio data from the portable audio device 2001 as shown in FIG. 6A. The tune information data includes tune image data, and the audio device 100 generates transmission image data from the read tune image data and sends the generated transmission image data to the portable audio device 200. Moreover, the audio device 100 performs playback based on the read audio data. Thus, displays in the audio device 100 and the portable audio device 200 reach the first display state.

Figure 6B:
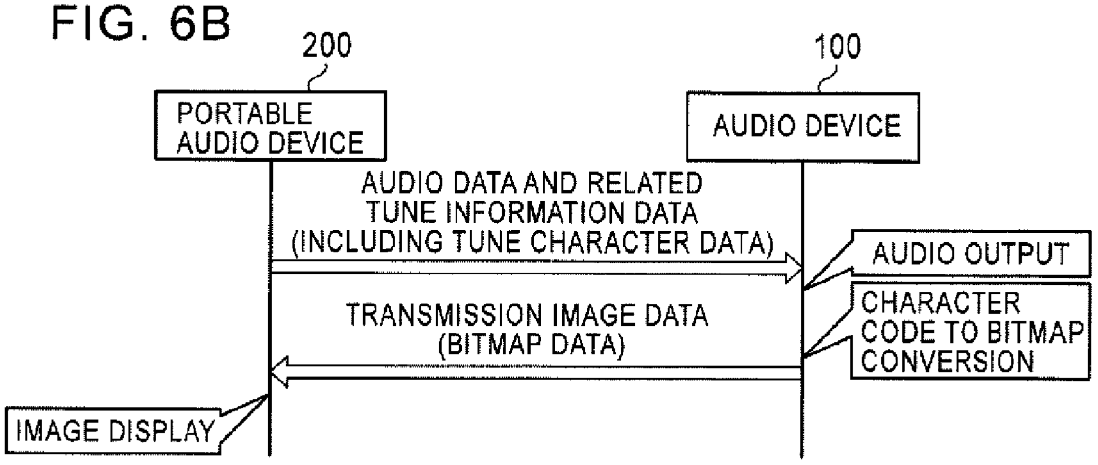

When characters based on tune character data are to be displayed in the portable audio device 200, under an instruction to perform playback based on the user operation and the like, the audio device 100 reads audio data and tune information data associated with the audio data from the portable audio device 200, as shown in FIG. 6B. The tune information data includes tune character data, and the audio device 100 generates transmission image data from the tune character data and sends the generated transmission image data to the portable audio device 200. Moreover, the audio device 100 performs playback based on the read audio data. Thus, displays in the audio device 100 and the portable audio device 200 reach the second display state.

In this case, it can be set by the user operation which of a display of an image based on tune image data and a display of characters based on tune character data is presented, or switching can be performed between these displays by the user operation. Moreover, for example, switching can be automatically performed at predetermined intervals between a display of characters based on tune character data and a display of an image based on tune image data while a tune is played back.

Figure 6C:
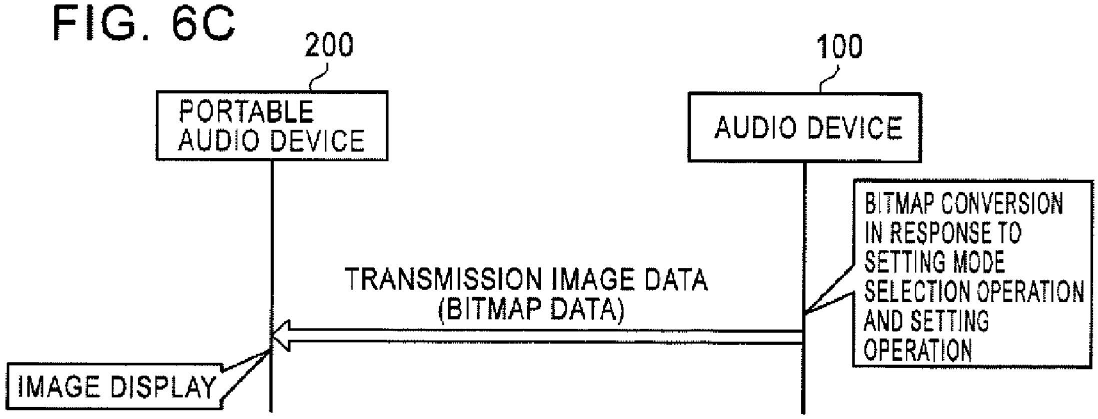
Figure 7:
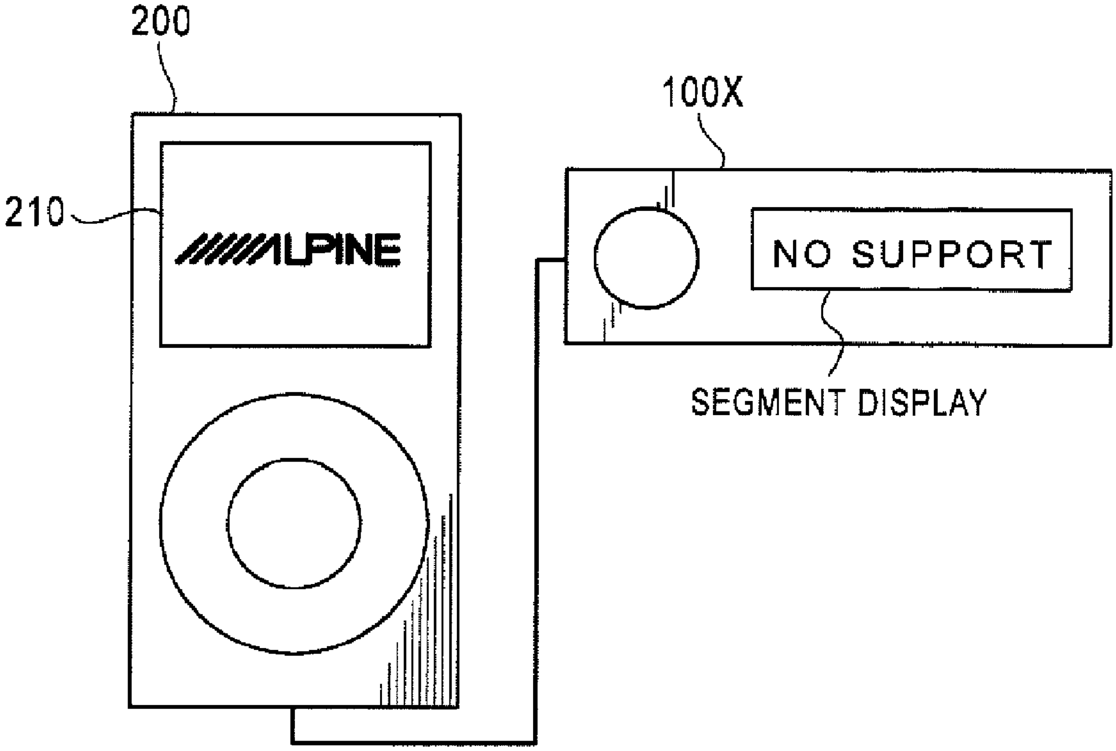
FIG. 7 illustrates a display state of a general in-vehicle audio device and a general portable audio device connected to each other with a USB.

When a setting mode for a function of the audio device 100 is selected by the user operation, the audio device 100 generates transmission image data from setting information image data and sends the generated transmission image data to the portable audio device 200, as shown in FIG. 6C. In addition, every time a setting operation is performed on a function of the audio device 100 by the user operation, the audio device 100 generates transmission image data from setting information image data corresponding to the function, on which the setting operation is performed, and sends the generated transmission image data to the portable audio device 200. Thus, displays in the audio device 100 and the portable audio device 200 reach the third display state.

In one embodiment, an image data generating unit and an image data format determining unit are implemented via the display generating unit 14, an image data sending unit is implemented via the communication unit 11, a data storage unit is implemented via the storage unit 50, and a setting information image generating unit is implemented via the setting-information image generating unit 15. Thus, the audio device 100 and a method for performing imaging and transmission of information in the audio device 100 can be implemented, in which, even when a low-cost segment display or the like is applied as the display unit, and when the portable audio device 200 displays input image data in a state in which the portable audio device 200 is connected to the audio device 100, useful information can be provided to the user using the display unit 210 in the portable audio device 200.

The aforementioned descriptions provides illustrative embodiments of the present invention. However, the present invention is not limited to the embodiments described above, and various types of change can be made in the embodiment without departing from the gist of the present invention. For example, the present invention is suitable for a case where a segment display is applied as a display unit in an audio device. Moreover, the present invention is not limited to this case and may be applied to a case where, for example, an LCD is applied.

It is therefore intended that the foregoing detailed description be regarded as illustrative rather than limiting, and that it is understood that it is the following claims, including all equivalents, which are intended to define the spirit and scope of this invention.

What is claimed is:

1. An in-vehicle audio device that can be connected to a portable audio device, the portable audio device configured to display image data received from a connected device on a display unit, the in-vehicle audio device comprising:

an image data generating unit operative to classify information data into data of information to be displayed on a display unit included in the in-vehicle audio device and data of information to be displayed on the display unit included in the portable audio device and to generate transmission image data in a format that can be displayed in the portable audio device from the data of information to be displayed on the display unit included in the portable audio device, the information data including information corresponding to a tune that is being played back or current setting information for a function of the in-vehicle audio device; and an image data sending unit operative to send the transmission image data generated by the image data generating unit to the portable audio device when the portable audio device is connected to the in-vehicle audio device.

2. The in-vehicle audio device of claim 1, wherein the information data comprises tune information data corresponding to audio data read from the portable audio device when the portable audio device is connected to the in-vehicle audio device.

3. The in-vehicle audio device of claim 2, wherein the tune information data comprises tune character data that includes character information associated with a tune.

4. The in-vehicle audio device of claim 2, wherein the tune information data comprises tune image data that includes image information associated with a tune.

5. The in-vehicle audio device of claim 3, wherein the image data generating unit reads font data corresponding to the character information constituting the tune character data from a data storage unit that stores the font data, and generates the transmission image data on the basis of the read font data.

6. The in-vehicle audio device of claim 4, further comprising:

an image data format determining unit operative to determine the format of the tune image data before the image data generating unit generates the transmission image data, wherein, when the image data format determining unit determines the format of the tune image data can be displayed in the portable audio device, the image data sending unit sends the tune image data to the portable audio device as the transmission image data.

7. The in-vehicle audio device of claim 1, wherein the information data is setting information image data that includes image information that schematically expresses setting information on a function of the in-vehicle audio device.

8. The in-vehicle audio device of claim 7, wherein, when a setting mode for performing a setting operation on a function of the in-vehicle audio device is selected, the image data generating unit generates the transmission image data from setting information image data corresponding to the function, on which the setting operation is performed in the selected setting mode, and the image data sending unit sends the transmission image data to the portable audio device.

9. The in-vehicle audio device of claim 8, wherein, when a setting operation is performed on a function of the in-vehicle audio device, the image data generating unit generates the transmission image data from the setting information image data corresponding to the function, on which the setting operation is performed, and the image data sending unit sends the transmission image data to the portable audio device.

10. The in-vehicle audio device of claim 7, wherein the setting information is setting information on a function of adjusting the timing of sound emission of individual speakers in the in-vehicle audio device, and the setting information image data is data that includes an image in which the setting information is schematically expressed in the form of a virtual layout of the speakers.

11. The in-vehicle audio device of claim 10, further comprising:

a setting information image generating unit operative to generate the setting information image data from setting information data that includes the setting information.

12. The in-vehicle audio device of claim 7, wherein the transmission image data is image data in the bitmap format.

13. A method for performing imaging and transmission of information in an in-vehicle audio device that can be connected to a portable audio device, the portable audio device configured to display image data received from a connected device on a display unit, the method comprising:

classifying information data into data of information to be displayed on a display unit included in the in-vehicle audio device and data of information to be displayed on the displayed on the display unit included in the portable audio device;

generating transmission image data in a format that can be displayed in the portable audio device from the data of information to be displayed on the display unit included in the portable audio device, the information data including information corresponding to a tune that is being played back or current setting information for a function of the in-vehicle audio device; and sending the generated transmission image data to the portable audio device when the portable audio device is connected to the in-vehicle audio device.

14. The method of claim 13, wherein the transmission image data is image data in the bitmap format.

15. The method of claim 13, wherein, in a case where the information data comprises tune information data corresponding to audio data read from the portable audio device when the portable audio device is connected to the in-vehicle audio device, when audio data and tune information data corresponding to the audio data are read from the portable audio device when the portable audio device is connected to the in-vehicle audio device in response to an instruction to perform playback, the transmission image data is generated from the read tune information data, and the transmission image data is sent to the portable audio device.

16. The method of claim 15, wherein, in a case where the information data comprises tune information data corresponding to audio data read from the portable audio device when the portable audio device is connected to the in-vehicle audio device, and the tune information data is tune character data that includes character information associated with a tune, the transmission image data is generated on the basis of font data corresponding to the character information constituting the tune character data.

17. The method of claim 16, wherein, in a case where the information data comprises tune information data corresponding to audio data read from the portable audio device when the portable audio device is connected to the in-vehicle audio device, and the tune information data is tune image data that includes image information associated with a tune, the format of the tune image data is determined before the transmission image data is generated from the tune image data, and when the determined format of the tune image data is a format of image data that can be displayed in the portable audio device, the tune image data is sent to the portable audio device as the transmission image data.

18. The method of claim 13, wherein, in a case where the information data comprises setting information image data that includes image information that schematically expresses setting information on a function of the in-vehicle audio device, when a setting mode for performing a setting operation on a function of the in-vehicle audio device is selected, the transmission image data is generated from setting information image data corresponding to the function, on which the setting operation is performed in the selected setting mode, and the transmission image data is sent to the portable audio device.

19. The method of claim 18, wherein, in a case where the information data comprises setting information image data that includes image information that schematically expresses setting information on a function of the in-vehicle audio device, when a setting operation is performed on a function of the in-vehicle audio device, the transmission image data is generated from setting information image data corresponding to the function, on which the setting operation is performed, and the transmission image data is sent to the portable audio device.

* * * * *